US011027336B2

(12) United States Patent
Mironets et al.

(10) Patent No.: US 11,027,336 B2
(45) Date of Patent: Jun. 8, 2021

(54) SPLATTER SHIELD SYSTEMS AND METHODS FOR ADDITIVE MANUFACTURING

(71) Applicant: Hamilton Sundstrand Corporation, Charlotte, NC (US)

(72) Inventors: Sergey Mironets, Charlotte, NC (US); Alexander Madinger, Chesterfield, MO (US); Diana Giulietti, Weatogue, CT (US); Dmitri Novikov, Avon, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 406 days.

(21) Appl. No.: 15/820,236

(22) Filed: Nov. 21, 2017

(65) Prior Publication Data

US 2019/0151943 A1 May 23, 2019

(51) Int. Cl.

| | |
|---|---|
| *B22F 10/00* | (2021.01) |
| *B33Y 30/00* | (2015.01) |
| *B33Y 40/00* | (2020.01) |
| *B33Y 50/02* | (2015.01) |
| *B33Y 10/00* | (2015.01) |
| B29C 64/153 | (2017.01) |
| B23K 26/342 | (2014.01) |

(Continued)

(52) U.S. Cl.
CPC .............. *B22F 10/00* (2021.01); *B33Y 10/00* (2014.12); *B33Y 30/00* (2014.12); *B33Y 40/00* (2014.12); *B33Y 50/02* (2014.12); B22F 10/10 (2021.01); B22F 2201/10 (2013.01); B23K 26/342 (2015.10); B29C 64/153 (2017.08); B29C 64/35 (2017.08)

(58) Field of Classification Search
None
See application file for complete search history.

(56) References Cited

U.S. PATENT DOCUMENTS

| | | | |
|---|---|---|---|
| 2010/0006228 A1 | 1/2010 | Abe et al. | |
| 2012/0126457 A1* | 5/2012 | Abe ...................... | B22F 3/1055 264/460 |
| 2017/0014905 A1 | 1/2017 | Kawada et al. | |

FOREIGN PATENT DOCUMENTS

| | | | |
|---|---|---|---|
| EP | 2431113 A1 | | 3/2012 |
| JP | 2010132960 A | * | 6/2010 |
| JP | 2010132961 A | * | 6/2010 |

(Continued)

OTHER PUBLICATIONS

Espacenet machine translation of DE102011109411, a WO2013017121 equivalent (Year: 2019).*

(Continued)

*Primary Examiner* — Sheng H Davis
*Assistant Examiner* — Christopher D. Moody
(74) *Attorney, Agent, or Firm* — Locke Lord LLP; Scott D. Wofsy; Gabrielle L. Gelozin

(57) ABSTRACT

A splatter shield system for an additive manufacturing machine includes one or more splatter shields configured to cover at least a portion of a build area during energy application such that the at least one splatter shield is positioned between an energy source of an additive manufacturing machine and the build area during energy application. The one or more splatter shields are transparent to an energy source (e.g., a laser) of the additive manufacturing system such that energy application occurs through the splatter shield.

12 Claims, 4 Drawing Sheets

(51) Int. Cl.
  *B29C 64/35*    (2017.01)
  *B22F 10/10*    (2021.01)

(56)          References Cited

FOREIGN PATENT DOCUMENTS

JP        5355213 B2    11/2013
WO      2013017121 A1    2/2013
WO      2016044561 A1    3/2016

OTHER PUBLICATIONS

JPlatPat machine translation of JP 2010-132960 (Year: 2019).*
JPlatPat machine translation of JP 2010-132961 (Year: 2019).*
"Channel." Merriam-Webster.com Dictionary, Merriam-Webster, https://www.merriamwebster.com/dictionary/channel. Accessed Sep. 8, 2020. (Year: 2020).*
The extended European search report issued in the corresponding EP patent application No. 18207473.2, dated May 23, 2019.

* cited by examiner

SPLATTER SHIELD SYSTEMS AND METHODS FOR ADDITIVE MANUFACTURING

BACKGROUND

1. Field

The present disclosure relates to additive manufacturing systems and methods.

2. Description of Related Art

During Laser Powder Bed Fusion (LPBF) a shield gas, such as Argon, is utilized to prevent material from oxidation. However, "dead zones" exist where material gets partially oxidized, resulting in inferior mechanical properties, because of non-uniform gas coverage. Also, during manufacturing, an ample amount of metal particles eject at the laser weld pool, become airborne, and get deposited back on top of powder bed along with product of metal evaporation (aka condensate). Chemical composition of the ejected particles and condensate exhibits much higher level of impurities than in a virgin powder.

As a result of powder recoating motion, contaminated powder gets spread across the entire build area and fused into parts. The level of contamination increases with powder reuse/recycling.

Such conventional methods and systems have generally been considered satisfactory for their intended purpose. However, there is still a need in the art for improved additive manufacturing systems and methods. The present disclosure provides a solution for this need.

SUMMARY

A splatter shield system for an additive manufacturing machine includes one or more splatter shields configured to cover at least a portion of a build area during energy application such that the at least one splatter shield is positioned between an energy source of an additive manufacturing machine and the build area during energy application. The one or more splatter shields are transparent to an energy source (e.g., a laser) of the additive manufacturing system such that energy application occurs through the splatter shield.

The one or more splatter shields can include a plate shape. The one or more splatter shields can be connected to and movable with a recoater system.

In certain embodiments, the one or more splatter shields can include two splatter shields, one on each side of the recoater system. For example, the recoater system can include at least one of a hopper, a roller recoater, or a knife recoater.

The one or more splatter shields can be made of at least one of sapphire, quartz, or transparent polycrystalline ceramic. In certain embodiments, the energy source can be a laser. Any other suitable material suitably transparent for any other suitable energy application (e.g., electron beam) is contemplated herein.

The splatter shield can be placed proximate the build area to form a gas flow channel for an inert gas to uniformly flow over the build area between the splatter shield and the build area. For example, the splatter shield can be separated by less than an inch. The system can include a controller configured to control movement of the recoater system, wherein the controller is configured to place the one or more splatter shields over the build area during energy application.

The system can include a splatter shield cleaning system configured to clean the one or more splatter shields. The splatter shield cleaning system can be configured to clean at least part of the one or more splatter shields during a recoating process. The splatter shield cleaning system can include a scraper configured to scrape an underside of the splatter shield as the shield moves over the scraper during the recoating process.

In accordance with at least one aspect of this disclosure, a method can include placing a splatter shield over a build area of an additive manufacturing machine between an energy source and the build area during energy application. The splatter shield is transparent to the energy source and is positioned to prevent splatter from energy application.

The method can include providing uniformly flowing inert gas between the splatter shield and the build area. The method can include cleaning the splatter shield during recoating of the build area.

The method can include controlling a gap size between build area and the splatter shield. The gap size is controlled to minimize overall inert gas flow, and/or to direct inert gas flow at an interface of a laser beam and powder bed, and/or to flush out particles and/or condensate towards exhaust vents.

These and other features of the systems and methods of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
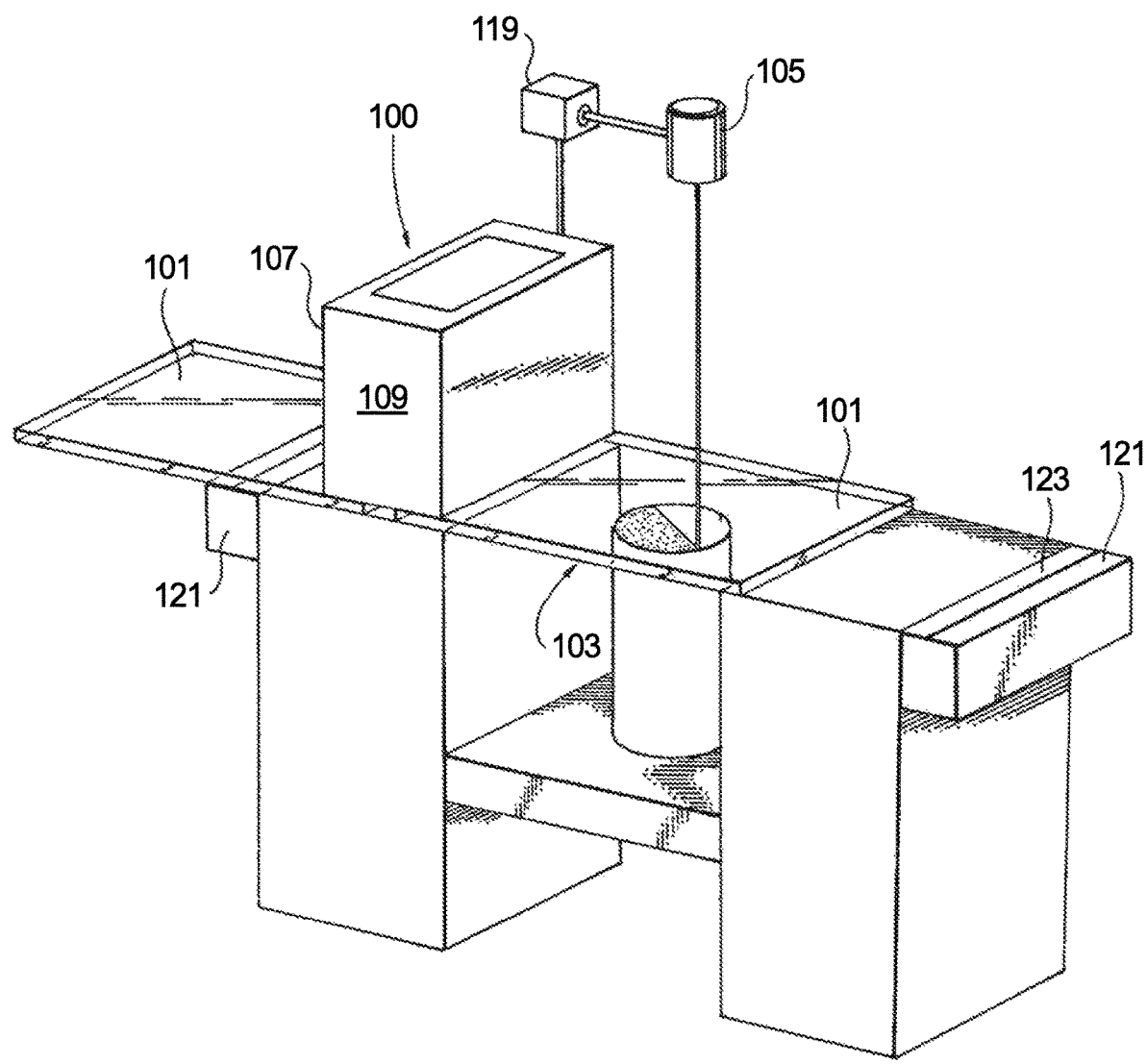
FIG. 1 is a perspective view of an embodiment of a system in accordance with this disclosure, showing the system in a first position and energy being applied to a build area.
Figure 2:
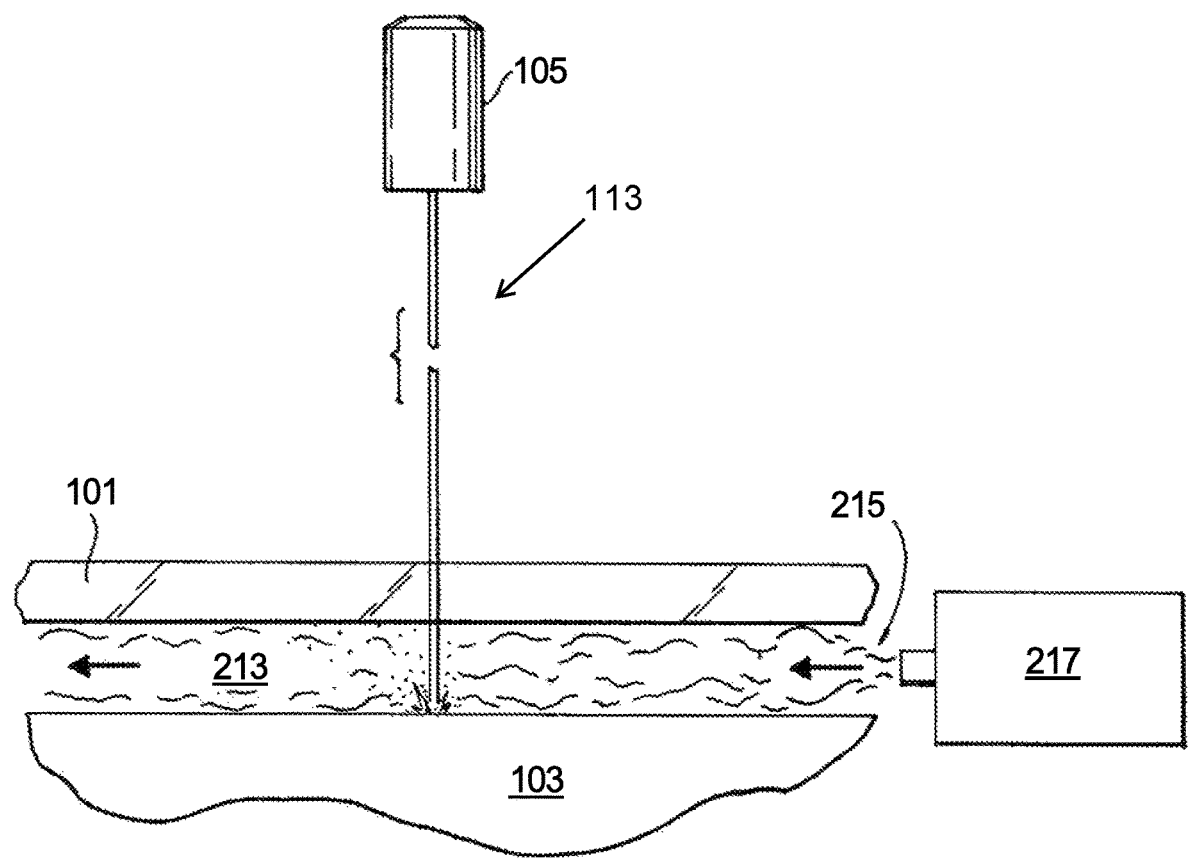
FIG. 2 is a schematic side view of the embodiment of FIG. 1, showing a gas flowing between the shield and the build area.
Figure 3:
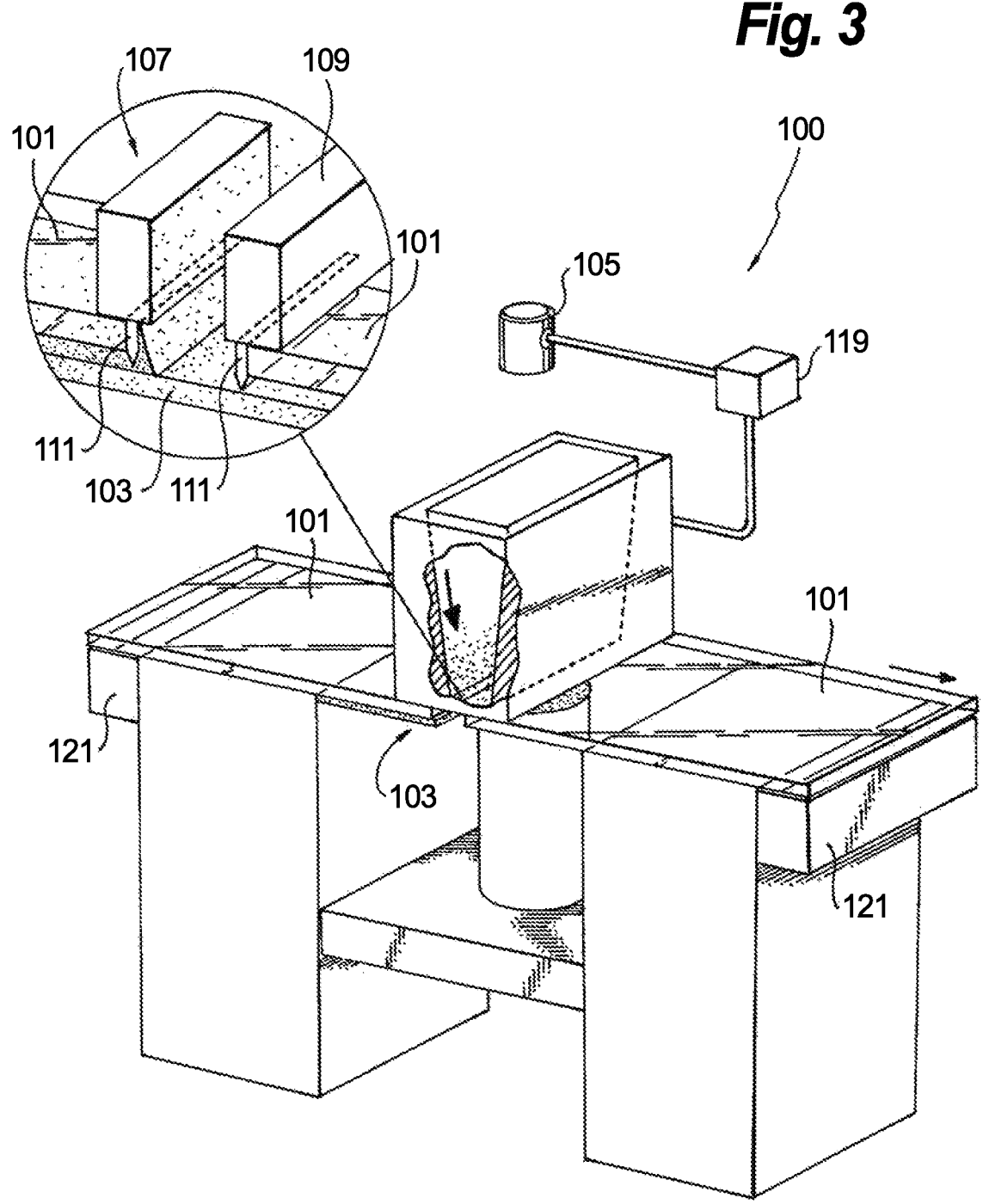
FIG. 3 is a perspective view and a zoomed view thereof of the embodiment of FIG. 1 in a recoating process, moving from left to right to recoat the build area.
Figure 4:
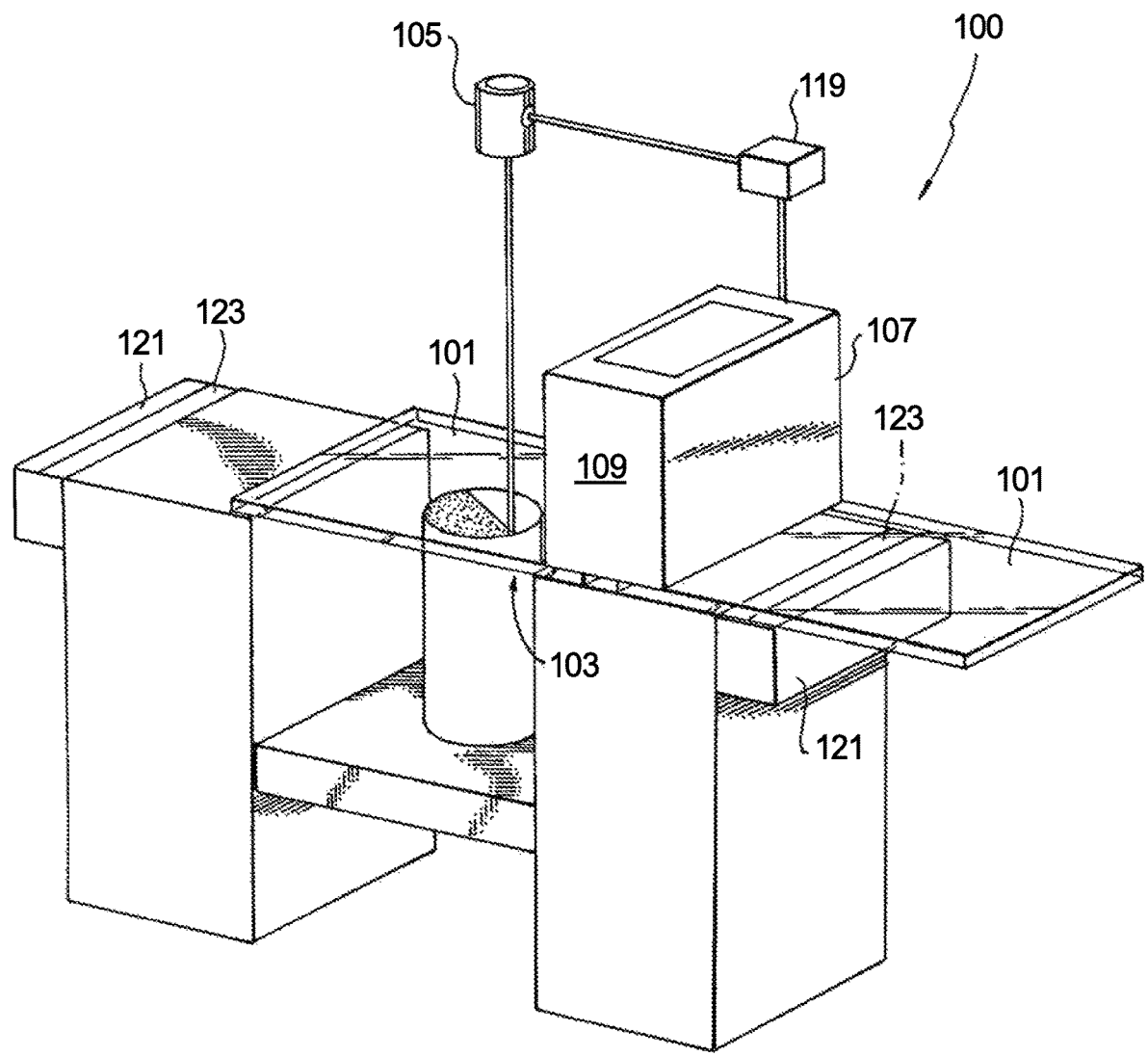
FIG. 4 is a perspective view of an embodiment of a system in accordance with this disclosure, showing the system in a second position and energy being applied to a build area.

Reference will now be made to the drawings wherein like reference numerals identify similar structural features or aspects of the subject disclosure. For purposes of explanation and illustration, and not limitation, an illustrative view of an embodiment of a system in accordance with the disclosure is shown in FIG. 1 and is designated generally by reference character 100. Other embodiments and/or aspects of this disclosure are shown in FIGS. 2-4. The systems and methods described herein can be used to enhance environment control and build quality in an additive manufacturing system, for example, or for any other purpose.

Referring to FIG. 1, a splatter shield system 100 for an additive manufacturing machine includes one or more splatter shields 101 configured to cover at least a portion of a build area 103 (e.g., a powder bed) during energy application (e.g., as shown in FIG. 1) such that the at least one splatter shield 101 is positioned between an energy source 105 of an additive manufacturing machine and the build area 103 during energy application. The one or more splatter shields 101 are transparent to an energy source (e.g., a laser) of the additive manufacturing system such that energy application occurs through the splatter shield 101.

The one or more splatter shields 101 can include a plate shape or any other suitable shape. The one or more splatter shields 101 can be sized to cover the entire build area 103 or any suitable portion thereof. The one or more splatter shields 101 can be connected to and movable with a recoater system 107 of the additive manufacturing machine.

In certain embodiments, the one or more splatter shields 101 can include two splatter shields 101 as shown, one on each side of the recoater system 107. For example, the recoater system 107 can include at least one of a hopper 109, a roller recoater (not shown), or one or more knife recoaters 111 (e.g., one on each side of the hopper 109 as shown).

The one or more splatter shields 101 can be made of at least one of sapphire, quartz, or transparent polycrystalline ceramic (e.g., aluminum oxynitride). In certain embodiments, the energy source 105 can be a laser 113. Any other suitable material (e.g., a glass or other ceramic) suitably transparent for any other suitable energy application (e.g., electron beam) is contemplated herein.

Referring additionally to FIG. 2, the splatter shield 101 can be placed proximate the build area 103 to form a gas flow channel 213 for an inert gas 215 (e.g., argon from a gas source 217) to uniformly flow over the build area 103 between the splatter shield 101 and the build area 103. For example, the splatter shield 101 can be separated by less than an inch from the build area 103. Any other suitable distance is contemplated herein (a few millimeters from the powder bed).

Gas flow can be considered when selecting the distance from the build area 103 powder bed that the shields 101 are positioned. In accordance with certain embodiments, gas can be pumped through the flow channel 213, and can be laminar because of the relatively small volume. In certain embodiments, the gas flow can act like an air knife and clean the splatter shield 101 while keeping the build environment inert and pulling condensate or ejecta out of the build area 103

Referring additionally to FIGS. 3 and 4, the system 100 can include a controller 119 configured to control movement of the recoater system 107. The controller 119 can also be configured to place the one or more splatter shields 101 over the build area 103 during energy application (e.g., as shown in FIGS. 1 and 4). The controller 119 can include any suitable hardware and/or software as appreciated by those having ordinary skill in the art and can be configured to execute any suitable method and/or portion thereof in accordance with this disclosure.

In certain embodiments, the system 100 can include a splatter shield cleaning system 121 that is configured to clean the one or more splatter shields 101. The splatter shield cleaning system 121 can be configured to clean at least part of the one or more splatter shields 101 during a recoating process (e.g., as shown in FIG. 3). The splatter shield cleaning system 121 can include a scraper 123 (e.g., one or more brushes, blades, or other suitable device) configured to scrape an underside of the splatter shield 101 as the shield 101 moves over the scraper 123 during the recoating process (e.g., as shown in FIG. 3).

While embodiments show two shields 101, one shield 101 can be used and the recoater can cycle back and forth each time and come to rest on the same side each time. As is appreciated by those having ordinary skill in the art in view of this disclosure, two shields 101 can allow the other shield 101 to be cleaned while the other is in use.

In accordance with at least one aspect of this disclosure, a method can include placing a splatter shield 101 over a build area 103 of an additive manufacturing machine between an energy source 105 and the build area 103 during energy application. The splatter shield 101 is transparent to the energy source 105 and is positioned to prevent splatter from energy application.

The method can include providing uniformly flowing inert gas between the splatter shield and the build area. The method can include cleaning the splatter shield during recoating of the build area. The method can include activating the energy source 105 when the shield 101 is positioned over the build area 103.

The method can include controlling a gap size between build area 103 and the splatter shield 101. The gap size is controlled to minimize overall inert gas flow, and/or to direct inert gas flow at an interface of a laser beam and powder bed, and/or to flush out particles and/or condensate towards exhaust vents.

Embodiments utilize transparent splatter shields 101 in close proximity to a powder bed surface to facilitate a continuously sealed environment, providing the benefits of uniform gas flow coverage and preventing ejected particles from getting redeposited. Using two shields 101 can facilitate dual powder recoating in both directions for time efficiency. The gap (flow channel 213) between the shield 101 and the powder bed can be optimized for allowing adequate, uniform, shield gas flow across the build area 103. In certain embodiments, the volume under the shield 101 can be controlled by utilizing vacuum partial pressure.

In certain cases, the working surface of the transparent shields 101 will get progressively contaminated. In certain embodiments, automatic shield replacement stations can be utilized to remove the used transparent shields 101 and install clean shields 101. Alternatively, since only one shield 101 is used per layer (e.g., either left or right as shown), the unused shields 101 can go through a cleaning process (e.g., using cleaning system 121 or any other suitable system or process). The shield 101 can provide a sealed environment for the powder bed below it but not impede the energy source (e.g., laser) that will be passing through it.

In certain embodiments, one or more shields 101 can be fixed to the left and right sides of an existing recoater of a laser powder bed fusion device. As appreciated by those having ordinary skill in the art, a recoater spreads a thin layer of powder across the top of previously selectively-fused layers, building the object up additively.

As shown in FIG. 3, the recoater 107 can spread powder from left to right of the bed shown FIG. 1, and then the left ceramic plate would be covering the build area (novel). The energy source can then fuse the deposited powder to a substrate through the shield 101. When the layer is complete, the recoater would spread the next layer from right to left, and then the right plate would cover the build area. This process can be repeated until the part is complete.

Using the one or more shields 101 can confine the redeposited particles to a close proximity to melt pool, for example, which minimizes the spread of the redepositied particles on the top of powder bed surface. Some of the ejected particles and/or condensate may attach to the one or more shields 101 and can be removed by a cleaning system as disclosed herein.

Embodiments provide benefits such as creating a "sealed" build environment and catching ejected particles, for example. The sealed build environment minimizes the adverse effect of non-uniform flow of shield gas. Catching ejected particles from the melt pool (as well as melt pool condensate) and limiting the area of spread of particles (e.g., to the melt pool) can prevent the formation of harmful material contamination. This can improve microstructure/properties of the final part, e.g., high temperature ductility and notch sensitivity at elevated temperatures, and provide the opportunity for utilizing additively build aerospace quality alloys for demanding applications.

Moreover, a controlled gap between the powder bed and the one or more shields 101 can be used to minimize the overall inert gas flow, to direct the inert gas flow at the interface of laser beam and powder bed, and to effectively flush out the condensate towards exhaust vents. As a result, a sieved recycled powder will have fewer ejected particles/contaminants allowing for a greater number of powder reuses that will minimize the overall cost.

As will be appreciated by those skilled in the art, aspects of the present disclosure may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention may be described above with reference to flowchart illustrations and/or block diagrams of methods, apparatus (systems) and computer program products according to embodiments of the invention. It will be understood that any method and/or portion thereof can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in any flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified herein.

Any suitable combination(s) of any disclosed embodiments and/or any suitable portion(s) thereof is contemplated therein as appreciated by those having ordinary skill in the art.

The embodiments of the present disclosure, as described above and shown in the drawings, provide for improvement in the art to which they pertain. While the subject disclosure includes reference to certain embodiments, those skilled in the art will readily appreciate that changes and/or modifications may be made thereto without departing from the spirit and scope of the subject disclosure.

What is claimed is:

1. An additive manufacturing system, comprising:
one or more splatter shield configured to cover at least a portion of a build area during energy application such that the one or more splatter shield is positioned between an energy source of the additive manufacturing system and the build area during an energy application, wherein the one or more splatter shields is transparent to the energy source of the additive manufacturing system such that the energy application occurs through the one or more splatter shield, wherein the one or more splatter shield is placed proximate the build area to form a gas flow channel for an inert gas to uniformly flow over the build area between the one or more splatter shield and the build area, wherein the one or more splatter shield is separated from the build area by less than one inch.

2. The additive manufacturing system of claim 1, wherein the one or more splatter shield includes a plate shape.

3. The additive manufacturing system of claim 1, wherein the one or more splatter shield is connected to and movable with a recoater system.

4. The additive manufacturing system of claim 3, wherein the one or more splatter shield includes two splatter shields, one on each side of the recoater system.

5. The additive manufacturing system of claim 3, wherein the recoater system includes at least one of a hopper, a roller recoater, and a knife recoater.

6. The additive manufacturing system of claim 1, wherein the one or more splatter shield is made of at least one of sapphire, quartz, and transparent polycrystalline ceramic.

7. The additive manufacturing system of claim 6, wherein the energy source is a laser.

8. The additive manufacturing system of claim 1, wherein the system includes a controller configured to control movement of the recoater system, wherein the controller is configured to place the one or more splatter shields over the build area during energy application.

9. The additive manufacturing system of claim 1, wherein the system includes a splatter shield cleaning system configured to clean the one or more splatter shield.

10. The additive manufacturing system of claim 9, wherein the splatter shield cleaning system is configured to clean at least part of the one or more splatter shield during a recoating process.

11. The additive manufacturing system of claim 10, wherein the splatter shield cleaning system includes a scraper configured to scrape an underside of the one or more splatter shield as the one or more splatter shield moves over the scraper during the recoating process.

12. The additive manufacturing system as recited in claim 1, wherein the one or more splatter shield is separated from the build area by 3-5 millimeters.

\* \* \* \* \*